May 9, 1944.　　　P. M. FREER　　　2,348,534
BRAKE
Filed May 3, 1943　　　2 Sheets-Sheet 1
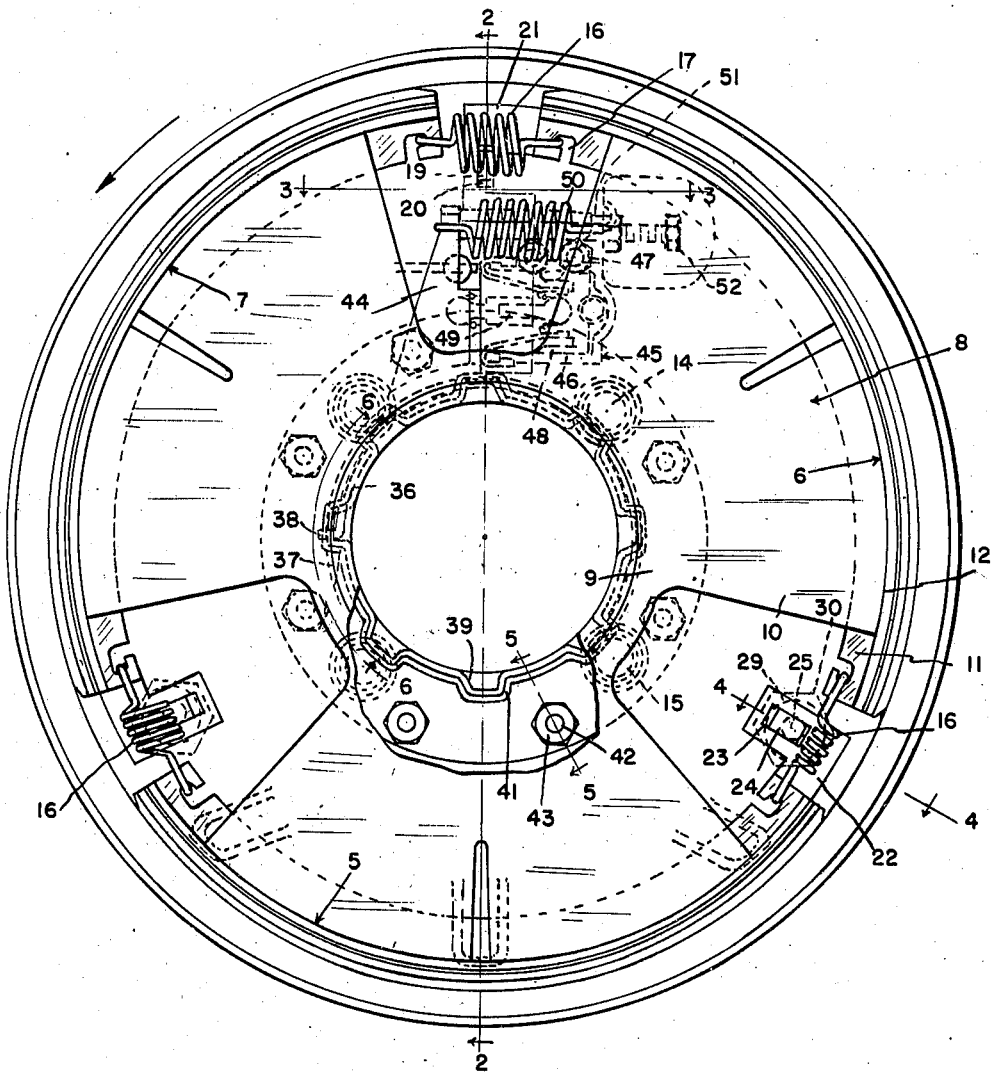
FIG.I.
INVENTOR.
PHELPS M. FREER
BY
ATTORNEYS May 9, 1944.                    P. M. FREER                    2,348,534
                                  BRAKE
                            Filed May 3, 1943                2 Sheets-Sheet 2
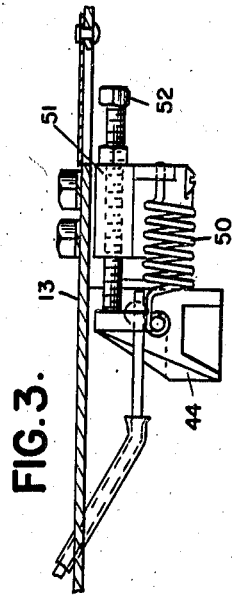
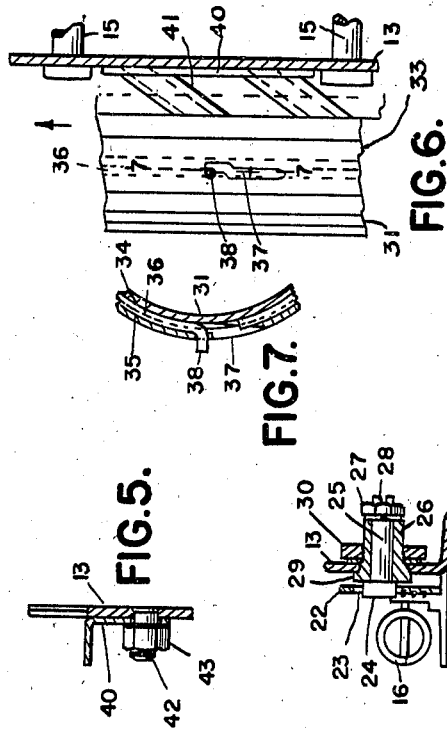
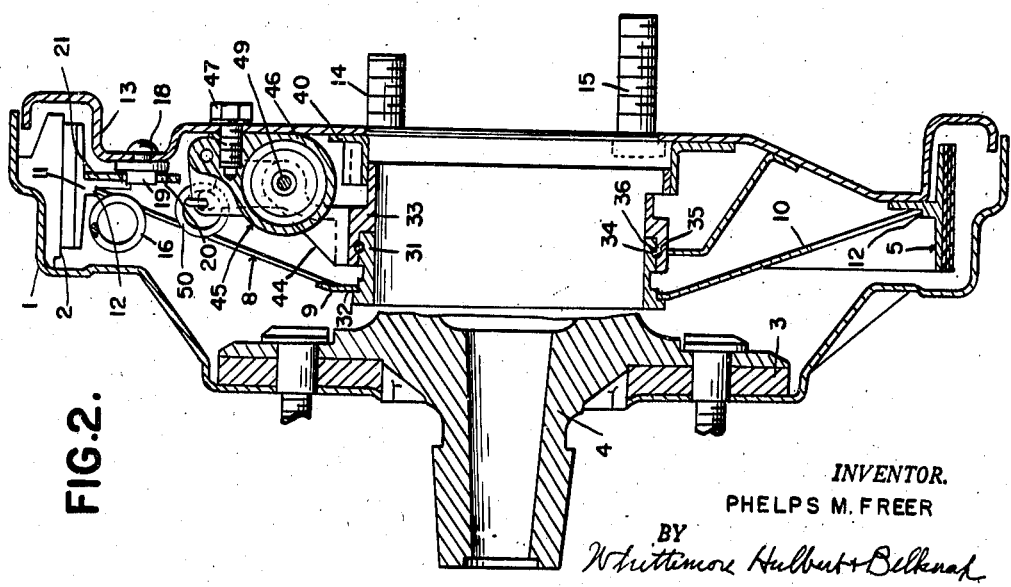
INVENTOR.
PHELPS M. FREER
BY
Whittemore Hulbert + Belknap
ATTORNEYS Patented May 9, 1944

2,348,534

UNITED STATES PATENT OFFICE 2,348,534

BRAKE

Phelps M. Freer, Detroit, Mich.

Application May 3, 1943, Serial No. 485,503

4 Claims. (Cl. 188—78)

The invention relates to brakes and refers more particularly to brakes of that type having a brake drum and internal brake shoes movable against the drum by means having an axially movable central portion and a radially movable outer portion.

The invention has for an object to provide an improved brake of the above mentioned type having actuating mechanism for exerting a powerful force positioned with respect to the backing plate of the brake so that the backing plate may easily carry the stress to which it is subject by the actuating mechanism.

The invention has for another object to provide an improved actuating mechanism having a member which is compelled to move axially upon its rotation.

The invention has for a further object to provide an improved actuating mechanism in which the rotatable member and the backing plate are provided with cooperating cam means for axially moving the rotatable member upon its rotation.

With these and other objects in view, the invention resides in the novel features of construction and combinations and arrangements of parts as more fully hereinafter set forth.

In the drawings:

Figure 1 is an elevation, with parts broken away and in section, of a brake embodying the invention;

Figures 2, 3, 4, 5 and 6 are cross sections on the lines 2—2, 3—3, 4—4, 5—5, and 6—6, respectively, of Figure 1;

Figure 7 is a cross section on the line 7—7 of Figure 6.

The rotatable friction element of the brake is formed of the brake drum 1 having the internal annular friction face 2. The brake drum, as shown, is mounted upon the fixed flange 3 of the hub 4, the fixed flange being provided with suitable means for securing a vehicle wheel thereto.

The non-rotatable friction element of the brake is formed of the lower, upper right and upper left brake shoes 5, 6 and 7, respectively, and the resilient disc 8 upon the periphery of which the shoes are mounted. The disc has the central portion 9 and the spokes 10 radiating from the central portion and equally spaced from each other, there being one spoke for each shoe. The shoes are preferably T-section shoes having their webs 11 formed at their outboard sides with the arcuate shoulders 12 for fitting the radially outer ends of the spokes 10. The disc is dished toward the webs of the shoes and serves to retain the webs against the backing plate 13 which is fixed either upon the axle housing or the steering spindle of the vehicle by suitable means, such as the upper and lower pairs of bolts 14 and 15, respectively. 16 are coil springs between the adjacent ends of the shoes for resiliently holding the shoes on the radially outer ends of the disc spokes. As shown, the webs 11 of the shoes are formed with the bayonet-shaped openings 17 for receiving the hooked ends of the coil springs.

The shoes 5, 6 and 7 are individually anchored and the anchoring arrangement is such that the non-rotatable element comprising the shoes and the disc may be adjustably centered relative to the rotatable element comprising the brake drum. The anchor for the upper right shoe 6 comprises the stud 18 fixedly secured to the backing plate 13 as by being riveted thereto and having the integral polygonal head 19 extending through the radial slot 20 in the plate 21 which is fixedly secured to the inboard side of the web 11 of the upper right shoe and extends beyond the end thereof. The radial slot 20 has parallel sides and is of a length to provide for the necessary radial movement of the plate to permit the upper right shoe to engage and clear the brake drum. It will be noted that with the brake drum normally rotating in the direction of the arrow shown in Figure 1 the anchor for the upper right shoe is at the trailing end thereof. The anchors for the lower and upper left shoes 5 and 7, respectively, are located at their trailing ends with the brake drum rotating in the direction of the arrow in Figure 1. These anchors are alike and are located in the same horizontal plane. Furthermore, these anchors are adjustable and serve to center the non-rotatable element, comprising the shoes and the disc, relative to the rotatable element, comprising the brake drum. In detail, the trailing end of each of the shoes 5 and 7 has secured to the inboard side of its web 11 the plate 22 as by welding. The plate extends peripherally beyond the shoe and is provided with the radial opening 23 having parallel sides. 24 is a polygonal head engaging the radial opening and 25 is a shank integral with the head extending through the eccentric 26 and externally threaded beyond the eccentric to receive the nut 27 for clamping the head to the eccentric. The shank is also formed beyond the nut with the diametral slot 28 for receiving a suitable tool, such as a screw driver, to position the head 24 so that its major axis extends radially of the brake. The length of the radial opening is greater than the length of the head 24 to provide radial clearance permitting radial movement of the trailing end portion of the shoe. The eccentric 26 extends through and is mounted on the backing plate 13, the eccentric having the enlargement 29 which is adapted to be clamped against the backing plate by the nut 30 threaded upon the eccentric.

With this construction, it will be seen that each of the eccentrics 26 can be rotatably adjusted upon the backing plate 13 after the nuts 30 have been loosened. Also that the heads 24 can be rotatably adjusted after the nuts 27 have been loosened to radially position the major axes of the heads. By adjusting the anchors for the lower and upper left shoes 5 and 7, respectively, the disc and also the shoes may be bodily moved to center the same with respect to the brake drum.

The shoes are moved radially outwardly against the internal friction face of the brake drum by flattening the resilient dished disc and thereby compelling the radially outer ends of the disc spokes to move radially outwardly. The mechanism for flattening the disc comprises the axially extending tubular member 31 which extends through the central portion 9 of the disc and has the radial flange 32 for abutting the outboard side of the central portion to operatively connect the tubular member to the disc. The mechanism also comprises the axially extending rotatable ring 33 telescoping the tubular member 31 with the telescoping portions of the tubular member and ring formed with the opposite annular grooves 34 and 35, respectively, in their adjacent faces. 36 is a transversely split resilient wire extending within the grooves for operatively connecting the ring to the tubular member and at the same time permitting relative rotation thereof. The wire is insertable through a slot 37 in the telescoping portion of the ring and the wire preferably has at one end the transverse terminal portion 38 which extends radially outwardly beyond the telescoping portion of the ring.

For the purpose of compelling the ring 33 to move axially in an inboard direction and toward the backing plate 13 upon rotation of the ring in one direction, the inboard end of the ring is formed with the cams 39 which are preferably arranged in pairs equally spaced about the periphery of the ring. The backing plate has secured thereto the brackets 40, each of which is provided with the stationary cams 41 arranged for engagement by the cams 39. The cams 39 and 41 are inclined toward the backing plate 13 in a direction such that when the ring is rotated in the direction of the arrow, shown in Figure 6, the ring is compelled to move axially toward the backing plate to correspondingly move the tubular member and thereby flatten the disc. The brackets 40 are adjustably secured to the backing plate by means of the studs 42 and the nuts 43, the studs extending through enlarged holes in the brackets. To rotate the ring 33 in the direction of the arrow shown in Figure 6, I have fixedly mounted upon the telescoping portion of the ring the bracket 44. This bracket extends generally radially from the ring and is operatively connected to the fluid pressure operated actuator or wheel cylinder 45 which is located adjacent the ring. The actuator comprises the cylinder 46 which extends chordwise of the drum closely adjacent to the ring 33 and is fixedly secured to the backing plate 13 by suitable means, such as the bolt 47. 48 is a piston slidable within the cylinder and operatively connected to the piston rod 49, which in turn is operatively connected to the bracket 44.

To normally hold the ring 33 in its retracted position, at which time the disc 8 is in its normal position and the shoes are retracted, I have provided the coil spring 50 having one end connected to the bracket 44 and the other end connected to the lug 51 upon the cylinder 46. 52 is a screw threaded through the lug 51 and abutting the bracket 44 to locate the ring 33 in its normal position.

In operation and with the parts in their normal retracted positions, it will be seen that when braking fluid under pressure is forced into the cylinder 46 it acts upon the piston 48 which, in turn, acts through the piston rod 49 upon the bracket 44 to rotate the ring 33 in the direction of the arrow shown in Figure 1 and also in the direction of the arrow shown in Figure 6. The rotation of the ring compels the cams 39 to ride over the cams 41 which cooperate to move the ring 33 axially in an inboard direction toward the backing plate 13. As a result, the tubular member 31 is compelled to correspondingly axially move and the disc 8 is flattened and the ends of its spokes force the shoes 5, 6 and 7 against the brake drum. Upon relieving the fluid pressure, it will be seen that the retracting spring 50 returns the parts to their normal positions, at which time the bracket 44 abuts the screw 52.

From the above description, it will be readily seen that I have provided a powerful mechanism for flattening the disc. Also that the fluid pressure operated actuator or wheel cylinder is located closely adjacent the ring of the mechanism and mounted on the inner portion of the backing plate so that the latter may easily resist the stress to which it is subject when the brake is applied.

What I claim as my invention is:

1. In a brake, the combination with a backing plate, a brake drum, internal brake shoes, and a resilient disc for moving said shoes against said drum, said disc having an axially movable central portion and a radially movable outer portion, of mechanism for axially moving said central portion comprising an axially extending tubular member operatively connected to said central portion, an axially extending rotatable ring operatively connected to said tubular member and formed with cam means, stationary cam means on said backing plate cooperating with said first mentioned cam means to axially move said ring upon rotation thereof, a bracket secured to and extending generally radially from said ring, and a fluid pressure actuated device mounted on said backing plate and extending generally chordwise of the brake adjacent to said ring and having a piston operatively connected to said bracket and movable in a direction to rotate said ring.

2. In a brake, the combination with a backing plate, a brake drum, internal brake shoes, and means for moving said shoes against said drum, said means comprising a member having an axially movable central portion and a radially movable outer portion, of mechanism for axially moving said central portion comprising an axially extending tubular member operatively connected to said central portion, an axially extending rotatable ring, said tubular member and ring having telescoping portions formed with opposed annular grooves in their adjacent faces, a member extending within said grooves for operatively connecting said ring to said tubular member, and cooperating means on said backing plate and ring for axially moving said ring upon rotation thereof.

3. In a brake, the combination with a backing plate, a brake drum, internal brake shoes, and means for moving said shoes against said drum, said means comprising a member having an axially movable central portion and a radially movable outer portion, of mechanism for axially moving said central portion comprising an axially extending tubular member operatively connected to said central portion, an axially extending rotatable ring, said tubular member and ring having telescoping portions formed with opposed annular grooves in their adjacent faces, a member extending within said grooves for operatively connecting said ring to said tubular member, and means mounted on said backing plate for axially moving said ring.

4. In a brake, the combination with a backing plate, a brake drum, internal brake shoes and a resilient dished disc for moving said shoes against said drum, said disc having an axially movable central portion and a radially movable outer portion, of mechanism for axially moving said central portion comprising a rotatable member operatively connected to said central portion, cooperating means on said backing plate and rotatable member for axially moving said rotatable member upon rotation thereof, and a fluid pressure actuated device mounted on said backing plate and extending generally chordwise of the brake adjacent to said rotatable member and having a piston operatively connected to said rotatable member and movable in a direction to rotate the same.

PHELPS M. FREER.